United States Patent Office 3,619,878
Patented Nov. 16, 1971

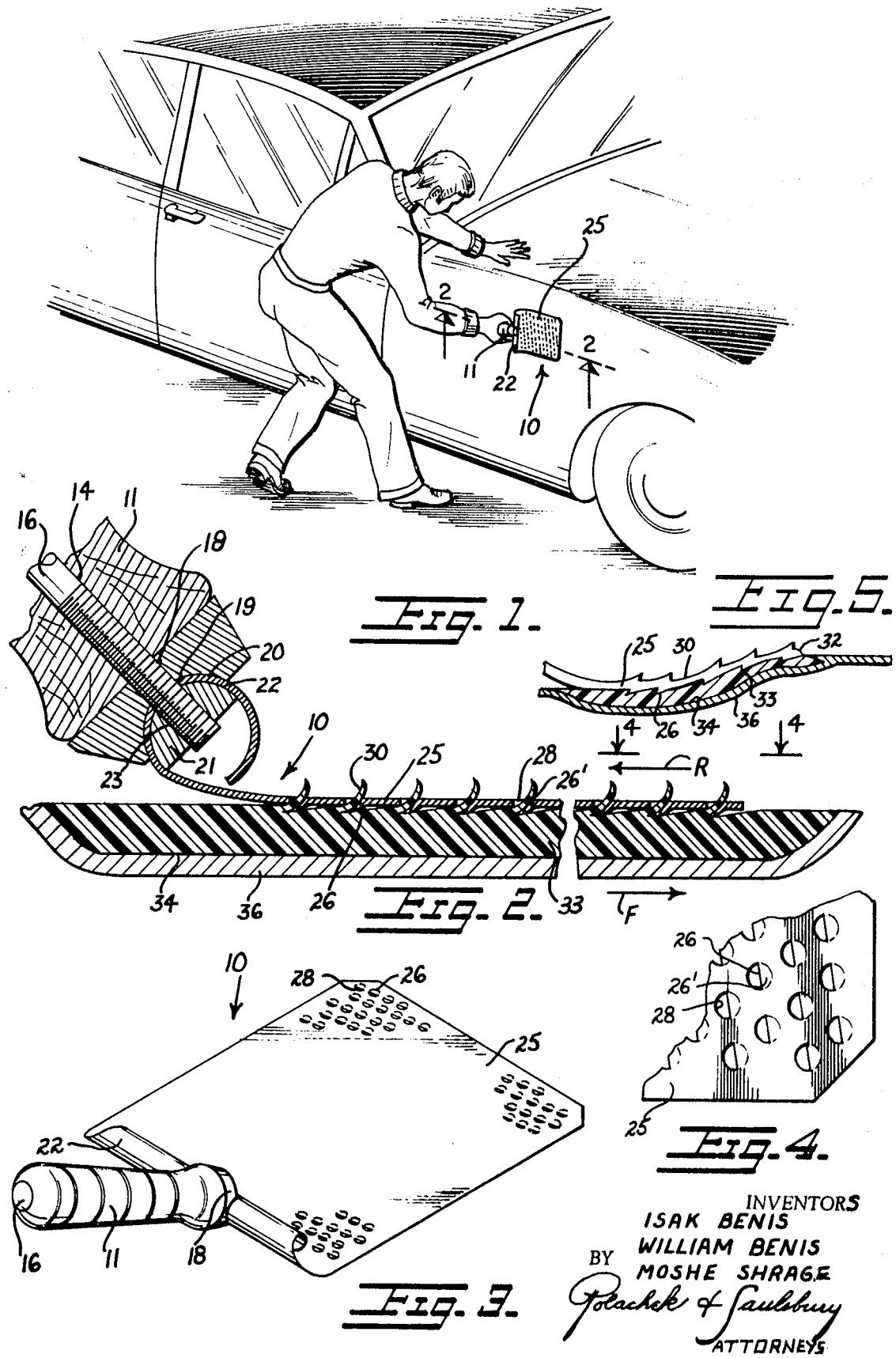

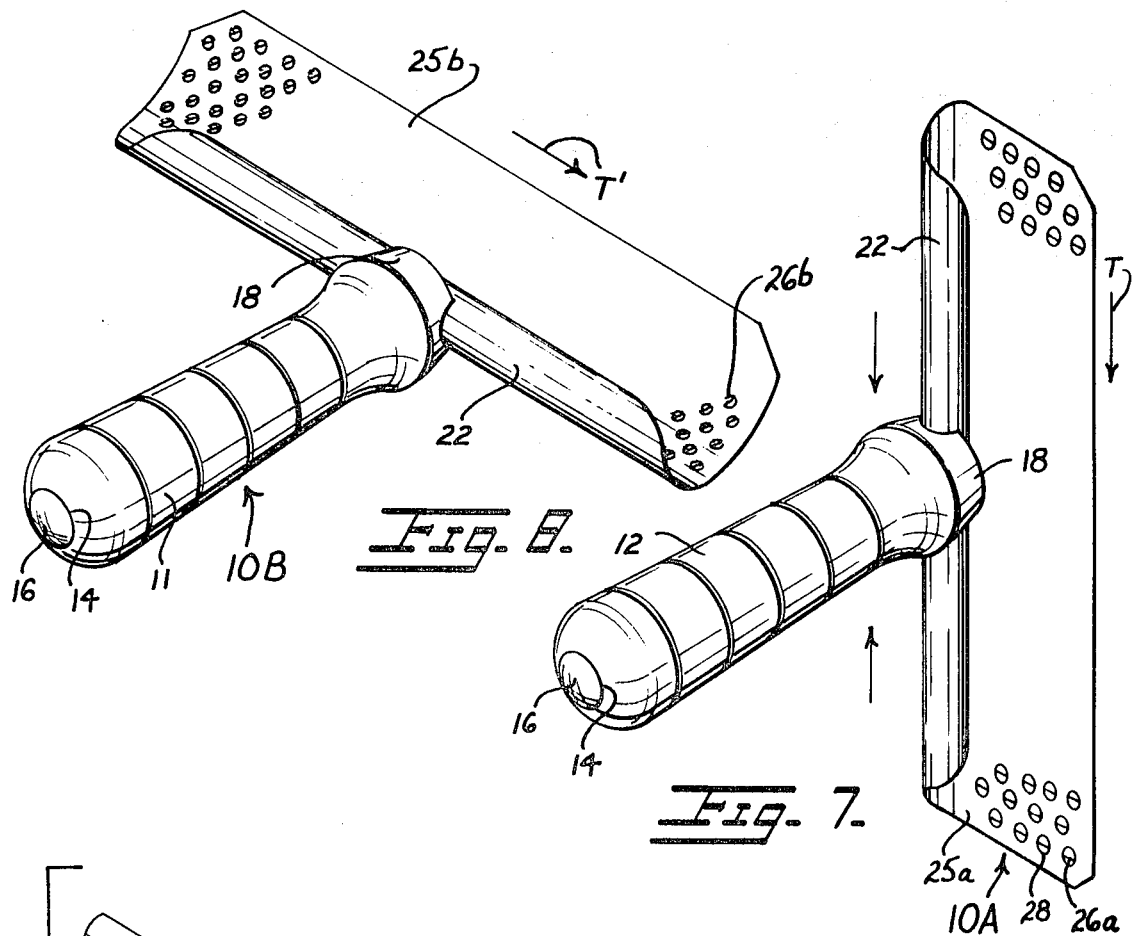
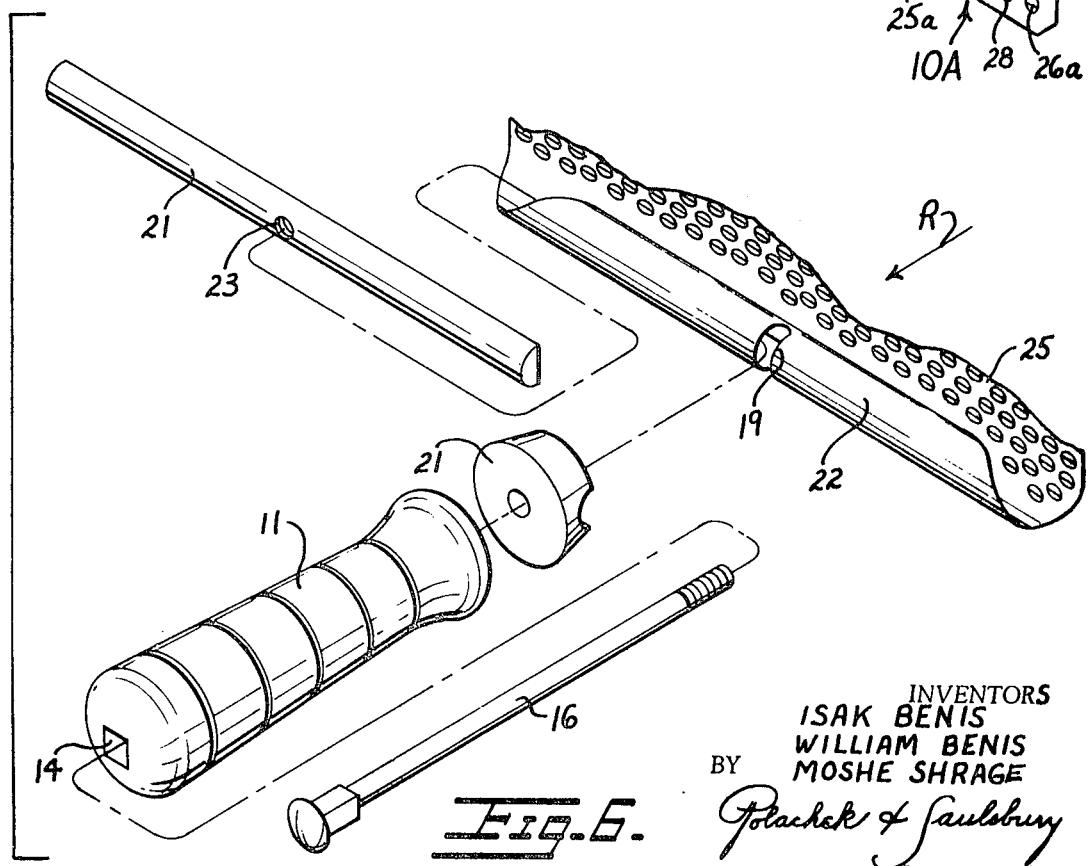

3,619,878
SHEET METAL SPEED FILE
Isak Benis, 1933 Fowler Ave., Bronx, N.Y. 10462;
William Benis, 304 Washington Ave., Tappan, N.Y.
10983; and Moshe Shrage, 2160 Matthews Ave., Bronx,
N.Y. 10462
Filed Dec. 2, 1969, Ser. No. 881,480
Int. Cl. B23d 71/00
U.S. Cl. 29—78          9 Claims

ABSTRACT OF THE DISCLOSURE

A tool for smoothing a hardened plastic filling in an indentation of a vehicle body, includes a handle, a flexible sheet metal cutter plate and attachment means for detachably and replaceably securing the plate to the handle. The cutter plate has sharp, inclined semicircular teeth struck out of one side of the plate. Holes adjacent the teeth pass chips cut loose by the teeth. The flexible plate conforms to the curvature of the vehicle body. The unflexed plate may be flat or curved. The plate may be longer than it is wide with the direction of length perpendicular or parallel to the handle. The teeth extend in the direction of length of the cutter plate.

---

This invention concerns flexible sheet metal files for smoothing surfaces of vehicle bodies.

Heretofore it has been the practice in repairing a dent or indentation in a sheet metal body, to apply an epoxy or polyester cement mixture consisting of a plasticised filler and a hardener. The mixture hardens in a few minutes. Thereafter the hardened plastic must be smoothed to the level of the surrounding body surface. In commercial establishments such as auto body shops, technicians must spend considerable time tediously filing the hardened plastic by hand with a hard metal file. Thereafter sandpaper or emery cloth is applied by hand or by means of a power sander to finish the surface. The finished surface is then ready for painting. The filing and sanding operations are very time consuming and are done at high labor cost.

The present invention is directed at providing a hand tool which will perform both filing and sanding operations simultaneously. This will effect great savings in time, labor and expense.

One object of the invention is to provide a speed file for smoothing a plastic filled dent in a car body, the file having a flexible sheet metal plate which will conform to curved surfaces of the car body, and which is formed with struck out sharp teeth on one side to cut the hardened plastic filler.

Another object is to provide a speed file as described with openings in the plate to remove chips from the surfaces being smoothed.

A further object is to provide a speed file as described wherein the flexible sheet metal plate is flat or curved.

A further object is to provide a hand tool including a handle, a flexible sheet cutter metal plate formed with struck out teeth at one side, and a plate holder detachably and replaceably joining the plate to the handle.

The invention will be explained in further detail in connection with the drawings, wherein:

FIG. 1 is a side view of the hand tool shown in use in smoothing the surface of a car body.

FIG. 2 is an enlarged fragmentary longitudinal sectional view taken on line 2—2 of FIG. 1, showing parts of the tool and the car body surface being dressed or smoothed.

FIG. 3 is a perspective view of the hand tool on a larger scale than in FIG. 1 but smaller than in FIG. 2.

FIG. 4 is a fragmentary plan view of the hand tool per se taken on line 4—4 of FIG. 2.

FIG. 5 is a fragmentary sectional view showing the tool in operation.

FIG. 6 is an exploded perspective view of parts of the hand tool of FIG. 5.

FIG. 7 and FIG. 8 are perspective views of two other hand tools embodying other forms of the invention.

Referring first to FIGS. 1–6, there is shown a hand tool 10 having a generally cylindrical handle 11 formed with an axial bore 14 in which is set a carriage bolt 16. The bolt extends outwardly of one end of the handle and terminates in a threaded end on which is engaged a conical washer 18. The washer is formed with a concave recess 20 in which fits an upwardly curved or curled edge portion 22 of generally rectangular plate 25. A holder bar 21 seats in curved edge portion 22. Threaded hole 23 in the bar engages the bolt which extends through hole 19 in curved edge portion 22. Plate 25 is formed with a multiplicity of semicircular teeth 26 struck downwardly from the plate at an acute angle. Circular openings 28 are located at the teeth. The teeth all extend rearwardly toward the handle in direction R. They are arranged in parallel rows transversely of the plate but are staggered in adjacent rows longitudinally of the plate. Slanted upper surfaces 26 of the teeth serve as guides in removing chips 30 cut loose from surface 32 of a hardened plastic filling 33 in indentation 34 of metal car body wall 36.

The teeth are effective in direction R in cutting the chips loose from the filling 33. These chips pass through openings 28. If any chips are not cut off fully, they will be cut off by succeeding teeth in alternate rows as the plate 25 is pulled along surface 32 in direction R. Sometimes chips will be loosened by the sharp teeth as shown in FIG. 2 when the tool is drawn or pulled in direction R. When the tool is then pushed forwardly in direction F, these chips will be bent inwardly by the inclined teeth toward the surface 32 to weaken the joints of the chips to the surface 32. Then the chips will be engaged and cut again by the inclined teeth as the tool is pulled back again until the chips are fully loosened and are removed via opening 28.

It will be apparent that the flexible plate will conform to irregularities or bends in the metal wall 36. This is clearly shown in FIG. 5 where plate 25 conforms to the curved surface 32 of plastic filling 33 in indentation 34 of wall 36.

FIG. 7 shows another form of the invention, wherein hand tool 10A is constructed like tool 10 and corresponding parts are identically numbered. Flexible sheet metal cutter plate 25a is flat and rectangular but its length is perpendicular to handle 11. The plane of the plate is perpendicular to the axis of the handle. This contrasts with the structure of plate 25 in tool 10 where the plate length is parallel to the handle. Teeth 26a extend out of the bottom of plate 25a in transverse direction T so that chips are cut when the tool is pulled in this direction.

FIG. 8 shows another tool 10B in which the teeth 26b extend in direction T which is perpendicular to the longitudinal axis of handle 11. Flexible cutter plate 25b is cylindrically curved. The teeth extend outwardly of the convex side of the plate. In all forms of the invention the teeth extend unidirectionally in the direction of greatest length of the flexible cutter plate with sharp edges parallel to the transverse width and perpendicular to length of the plates. The plates can easily be removed and discarded when the teeth become worn and new plates can be quickly attached to the handle. The flexible cutter plates conform to differently curved portions of the metal body and cut the hardened plastic fillers to conform thereto.

The tool cuts fast and leaves a smooth surface ready for paint priming and finishing. The tool can be manufactured inexpensively by mass production metal working machinery. Handle 11 can be made of wood, metal or plastic.

We claim:

1. A speed file for smoothing a hardened plastic filling of an indentation in a surface of a vehicle body, comprising a generally cylindrical handle, a generally rectangular sheet metal plate having a plurality of semicircular teeth struck at an acute angle out of one side of the plate for cutting chips loose from said filling with a circular opening at each tooth for passing cut chips therethrough, said plate being sufficiently flexible to conform to a curvature in said surface so that the filling is smoothed to conform to said curvature, means for attaching said plate at one edge thereof to said handle, said one edge portion of the plate is cylindrically curved, a washer having a recess abutting a convex side of said curved edge portion, a holder bar inside said curved edge, and a bolt extending through the handle and detachably engaged with said bar.

2. A speed file as defined in claim 1, wherein the plate is substantially longer than it is wide, said teeth extending away from said one side thereof in one direction substantially in the direction of length of the plate with edges of the teeth parallel to the direction of width of the plate.

3. A speed file as defined in claim 2, wherein the direction of length of the plate is substantially parallel to the axis of the handle.

4. A speed file as defined in claim 2, wherein the direction of length of the plate is perpendicular to the axis of the handle.

5. A speed file as defined in claim 4, wherein a major portion of the plate is substantially flat and perpendicular to the axis of the handle.

6. A speed file as defined in claim 4, wherein the plate is curved between said one edge and the opposite edge.

7. A speed file as defined in claim 2, wherein said one edge of the plate is cylindrically curved; a washer having a recess abutting a convex side of said curved edge portion; a holder bar inside said curved edge; and a bolt extending through the handle and detachably engaged with said bar.

8. A speed file as defined in claim 1, wherein a major portion of the plate is substantially flat.

9. A speed file as defined in claim 1, wherein a major portion of the plate is cylindrically curved from said one edge portion to the opposite edge of the plate.

References Cited

UNITED STATES PATENTS

| | | | |
|---|---|---|---|
| 973,780 | 10/1910 | Harvey | 29—78 |
| 1,828,813 | 10/1931 | Lehmann | 81—15.2 |
| 1,708,346 | 4/1929 | Worrell et al. | 29—78 X |
| 1,759,739 | 5/1930 | Ferris | 29—78 |
| 703,868 | 7/1902 | Weder | 29—78 X |
| 835,160 | 11/1906 | Lutz | 29—78 X |
| 2,058,912 | 10/1936 | Reid | 29—78 |
| 3,531,841 | 10/1970 | McCord, Jr. | 29—78 |

FOREIGN PATENTS

| | | | |
|---|---|---|---|
| 54,536 | 11/1916 | Austria | 29—78 |

HARRISON L. HINSON, Primary Examiner